July 20, 1965 M. NOAILLON ETAL 3,196,456
COLLECTIVE SELECTOR FOR STEREOSCOPIC PROJECTIONS
WITHOUT EYEGLASSES
Filed Jan. 22, 1963 3 Sheets-Sheet 3
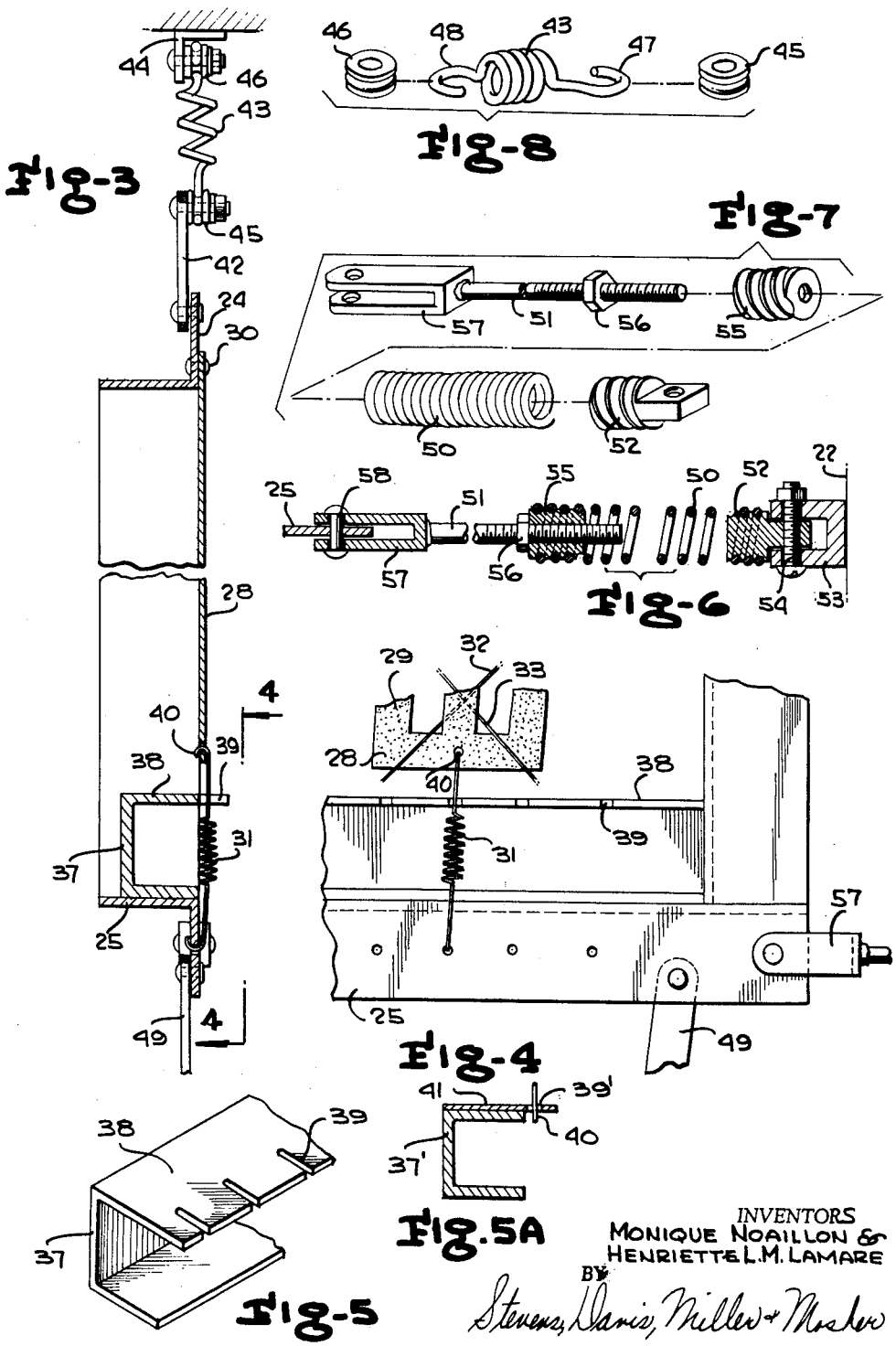
INVENTORS
MONIQUE NOAILLON &
HENRIETTE L.M. LAMARE
BY
Stevens, Davis, Miller & Mosher
ATTORNEYS

United States Patent Office 3,196,456
Patented July 20, 1965

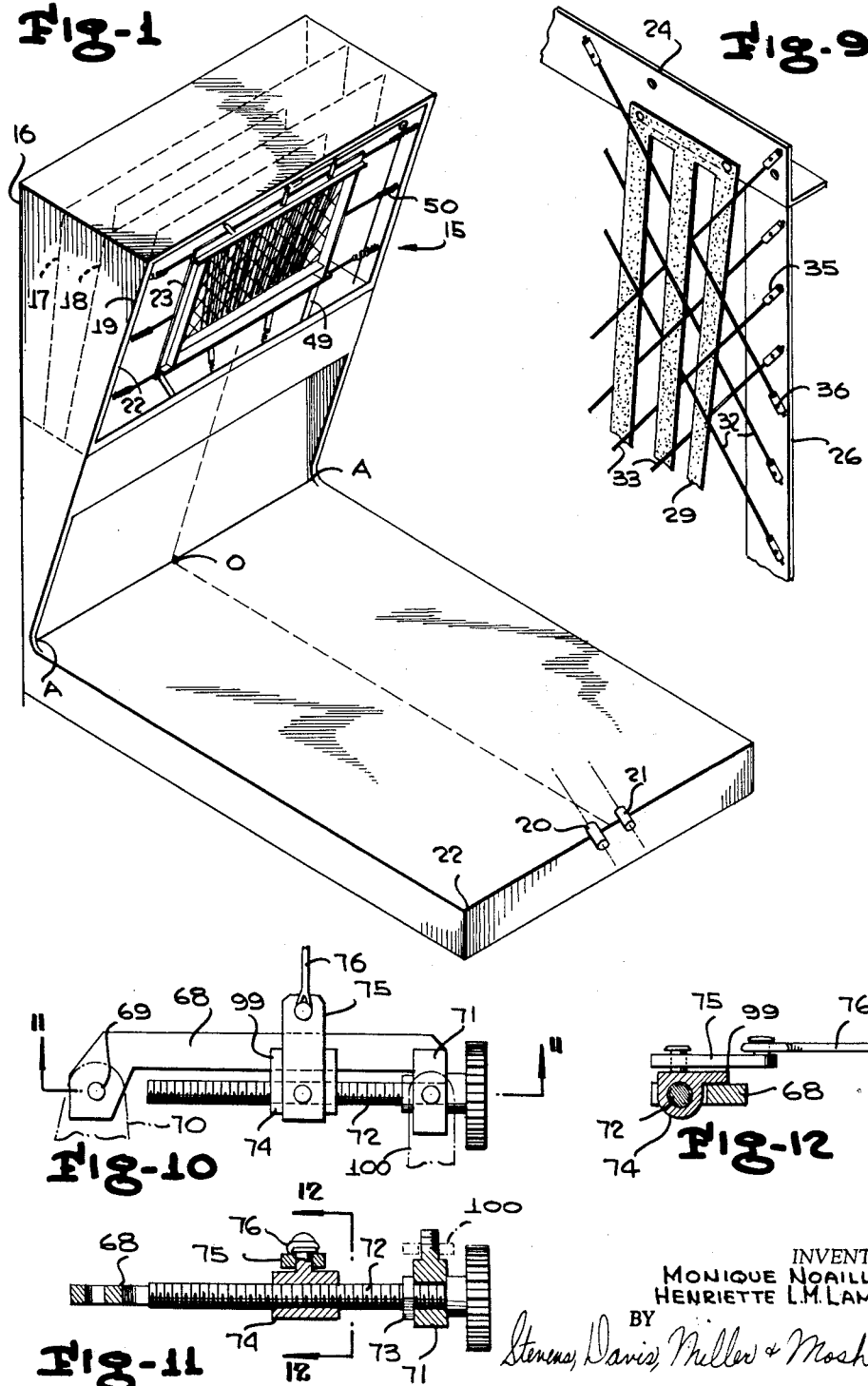

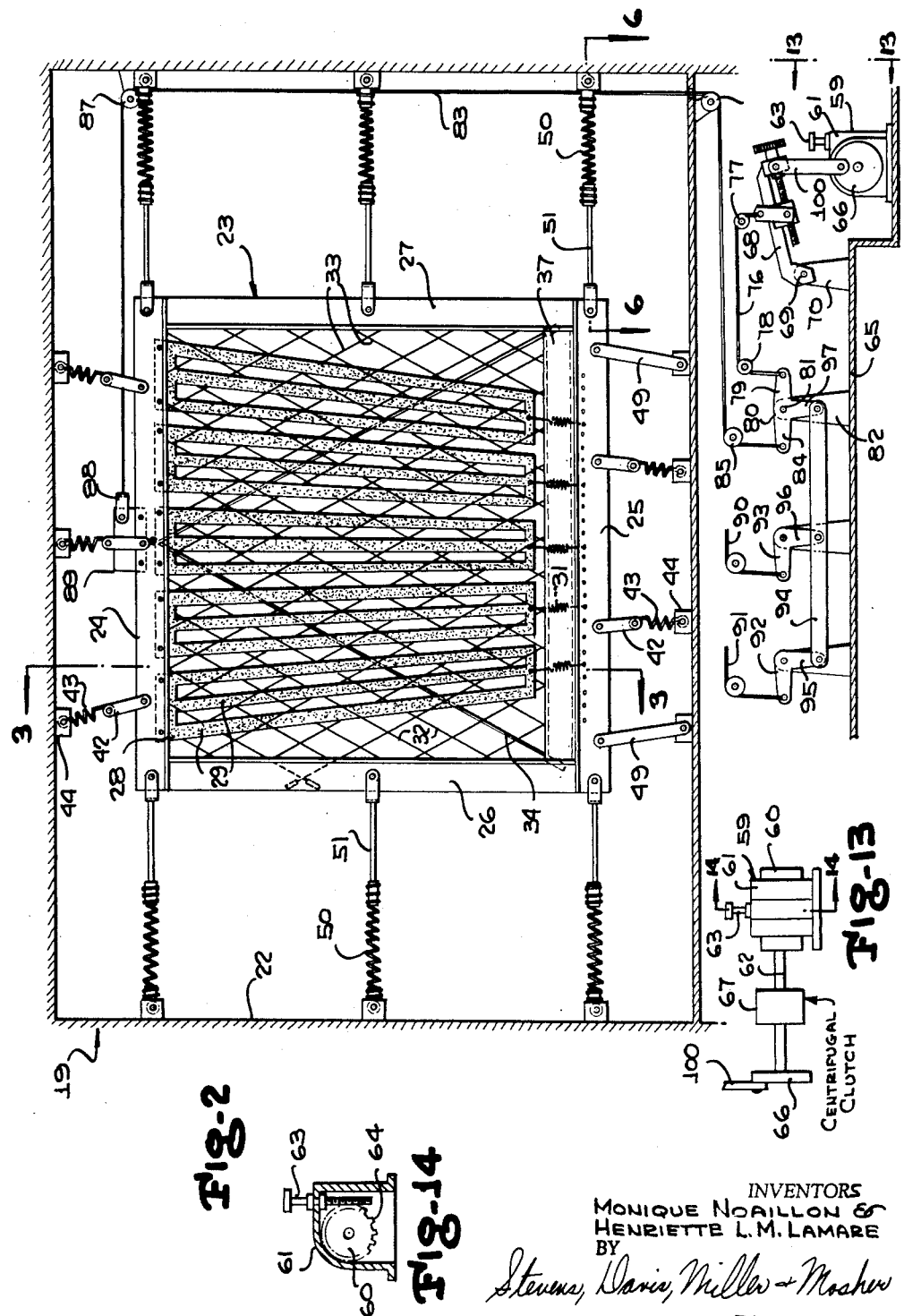

3,196,456
COLLECTIVE SELECTOR FOR STEREOSCOPIC
PROJECTIONS WITHOUT EYEGLASSES
Monique Noaillon and Henriette Louise Marie Lamare,
both of 53 Ave. Jupiter, Forest-Brussels, Belgium
Filed Jan. 22, 1963, Ser. No. 253,111
Claims priority, application Belgium, Jan. 22, 1962,
488,834, Patent 612,899
11 Claims. (Cl. 352—61)

This invention relates to devices for the stereoscopic projection of pictures, and more particularly, for cinematographic projection in which two series or sequences of stereoscopic pictures are synchronously or successively projected on a screen, one of the sequences being intended for right eye vision and for viewing by only the right eye of any spectator whatever, and the other sequence being intended for left eye vision and for viewing by only the left eye of the spectator, and in which this desired result is obtained by interposing between the screen and the spectators a collective selector which eliminates the necessity of using special individual eyeglasses, the selector being composed of one or several filter screens comprising plane surfaces formed by series of regularly spaced light-absorbing strips.

It is well known, for example from U.S. Patent No. 2,198,678, that when projecting pairs or couples of stereoscopic images, it is possible to obtain the exclusive vision either of the left picture or of the right picture of these couples when projecting these views onto a screen through the slits between filter strips or bars, so that the left image, for example, projected onto the screen in the form of luminous stripes, will be invisible to the eye from all locations in the room where the filter strips happen to be in the path of view leading to the stripes.

However, when interposing right luminous stripes between these left luminous stripes, the spectators will find many vision zones of two kinds, namely, zones where the spectators will see left luminous stripes without seeing any of the right ones, and zones where only the right luminous stripes will be seen.

It is also known, for example, from the above mentioned prior patent, that the filters must comply with particular requirements in order that the useful viewing zones be sufficiently wide and close enough to the screen to be correctly and comfortably viewed. Upon compliance with these requirements, the filter screens possess the property of selecting, in the form of luminous stripes, the pictures intended respectively for the left and right eyes of the spectators.

Furthermore, as taught by the above-mentioned Patent No. 2,198,678, in order that the pictures appear not in the form of stripes but with full continuity, it is necessary to impart to the frames which contain the filter strips a rapid oscillating movement in their own plane, the amplitude of which is sufficiently limited as not to disturb the vision zones.

A main purpose of the present invention is to provide an improved construction which substantially overcomes the effects of inertia during the rapid alternating movement of the filter screens, which provides successful movement of the filter screens without detracting from their optical qualities, and which enables spectators to enjoy substantially faultless stereoscopic or three-dimensional viewing without the use of special eyeglasses. Because of their substantial length, the inertia forces developing on the strips from their rapid changes in direction would cause bending or distortion thereof, producing undesired overlapping and disturbance of stereoscopic vision. It is therefore necessary to provide means to maintain the strips in proper relative positions during their oscillation. The present invention aims to provide such means, but substantially without allowing the stabilizing connections of the strips to be visible during operation.

A further purpose of the invention is to provide an improved oscillating filter structure of the character above described wherein perception of component luminous stripes and shadows produced at the times when the strips momentarily stop in order to reverse their directions of movement is reduced to a minimum.

A further objective of the present invention is to provied an improved oscillating filter structure of substantial size wherein the inertia forces are effectively controlled by preventing transverse vibrations of the filter components and by preventing oscillation of the filter units at other than the correct frequency and amplitude.

Further objects and advantages of the invention will become apparent from the following description and claims, and from the accompanying drawings, wherein:

FIGURE 1 is a diagrammatic view showing in perspective the relationship between the reflecting screen, projectors and improved filters of a stereoscopic projection system to the present invention as they would be disposed in a cinema hall.

FIGURE 2 is a vertical cross-sectional view taken through the upper portion of the assembly of FIGURE 1, showing the improved filter structure and parts cooperating therewith in front elevation.

FIGURE 3 is an enlarged fragmentary vertical cross-sectional view taken substantially on the line 3—3 of FIGURE 2.

FIGURE 4 is an elevational view taken substantially on the line 4—4 of FIGURE 3.

FIGURE 5 is an enlarged fragmentary perspective view of a portion of the guide and retainer for the bottom connecting springs of the filter strip bodies in the assembly of FIGURES 1 to 4.

FIGURE 5A is a cross-sectional view showing a modified form of retainer for the bottom connecting springs.

FIGURE 6 is an enlarged horizontal cross-sectional view taken substantially on line 6—6 of FIGURE 2.

FIGURE 7 is an exploded perspective view showing the components of the horizontal spring connection assembly of FIGURE 6.

FIGURE 8 is an enlarged exploded perspective view showing the components of one of the upper spring connection assemblies employed in the filter supporting arrangement of FIGURE 2.

FIGURE 9 is an enlarged rear perspective view of an upper corner portion of the filter frame assembly of FIGURE 2, showing the diagonal retaining wires tressed and interwoven with each other and with the filter strips.

FIGURE 10 is an enlarged elevational view of the adjustable drive lever member employed in the arrangement illustrated in FIGURE 2.

FIGURE 11 is a longitudinal cross-sectional view taken substantially on line 11—11 of FIGURE 10.

FIGURE 12 is a transverse cross-sectional view taken on line 12—12 of FIGURE 11.

FIGURE 13 is an enlarged elevational view taken substantially on line 13—13 of FIGURE 2.

FIGURE 14 is a transverse vertical cross-sectional view taken on line 14—14 of FIGURE 13.

Referring to the drawings, 15 generally designates an improved apparatus for the stereoscopic projection of pictures in accordance with the present invention. Basicly, the apparatus 15 is generally similar to the apparatus disclosed in U.S. Patent No. 2,198,678 and comprises a reflecting screen 16 (FIGURE 1) in front of which filters are arranged. The filters are designated by reference numerals 17, 18 and 19, and are so tilted that the planes of the filters when extended to their line of intersection will meet with the extended plane of the screen 16 in a common horizontal line A—A. The point 0 which is located on line A—A is the point on which the edges of all the filter strips mounted on said filters would meet if the same were extended.

A pair of projection lenses 20 and 21 are located in front of apparatus 15. These projection lenses project simultaneously two conjugated pictures on the screen 16 through the slits between the filter strips.

The relative positions of the filters, filter strips, screen and images thereon, are substantially the same as disclosed in the aforesaid prior U.S. Patent No. 2,198,678. The relative locations and widths of the stirps of the filters 17, 18 and 19 are also substantially the same as in said prior patent.

As is pointed out in said prior patent, it is necessary to minimize the force required to oscillate the filters, namely, to reduce the inertia of the filters as much as possible. The filters are of relatively large dimensions and must oscillate with substantial amplitudes and frequencies. In accordance with the present invention, the inertia forces are minimized by employing filter constructions and yieldable support means therefor which are to be presently described.

Referring to FIGURE 2, which shows a typical filter, for example, the filter 19, in elevation, it will be seen that the filter assembly is mounted in a rectangular stationary outer supporting frame 22. The movable filter assembly proper is designated generally at 23. Said assembly 23 comprises a rigid rectangular frame consisting of top and bottom angle bars 24 and 25 and side angle bars 26 and 27, arranged in the manner illustrated in FIGURES 2 and 3.

The angle bars 24, 25, 26 and 27 are made of light strong material, such as aluminum alloy or rigid synthetic plastic material, and have coplanar outwardly projecting flanges located in the plane of the filter screen. Secured in the frame and occupying the major part of its area are a series of strips 29 or strip-defining bodies 28 of thin relatively rigid sheet material, each body being formed to define a plurality of stirps 29, the strips being uniformly spaced over the width of the frame, and being arranged so that their median lines and side edges converge downwardly toward the same point. The top margins of the bodies 28 are rigidly secured to the top frame bar 24 by small bolts or rivets 30, while the bottom margins thereof are attached to the bottom frame bar 25 by means of small springs 31 which are of sufficient strength and stiffness to impose the tension on the bodies 28 required to maintain them at all times substantially in the plane of the frame. The strips 29 are further confined and supported in substantially fixed positions in the frame by interwoven diagonally extending wires comprising two sets of parallel evenly spaced diagonally arranged tensioned wires 32 and 33 arranged in opposite diagonal directions and secured at their ends to the frame bars, said wires being each tressed in duplicate and interwoven with each other and with the strips 29 in the manner clearly shown in FIGURE 9, wherein the strips are bound in the interwoven lattice defined by the wires and are held substantially coplanar with the frame by the tension in the wires, which resists lateral flexure or transverse flexure of the strips.

A tensioned reinforcing cable 34 of inverted V-shape connects the midpoint of top angle bar 24 to the opposite lower corners of the filter assembly frame, the strip-constraining wires 32 being parallel to one leg of the cable and the strip-constraining wires 33 being parallel to the opposite leg thereof.

The ends of the constraining wires 32 and 33 may be fastened to the frame by means of sleeves 35 fixed to the frame bars, said sleeves being provided with set screws 36 to clamp the wires after their tension has been adjusted, and to permit equalization of the tension in said wires. The reinforcing cable 34 is provided with similar clamping means at its ends, whereby to allow for adjustment of its tension.

By this construction, the strips will be held against flexure or displacement relative to the frame while the frame is in rapid oscillatory movement. Said movement is sufficiently rapid so that the strips will appear to be invisible. Due to the diagonal arrangement of the constraint wires 32 and 33, said wires will also be invisible. This would not be the case if the constraint wires were arranged horizontally, as in U.S. Patent No. 2,198,678. Furthermore, by securely supporting the strips against flexure or displacement relative to the plane of the frame, it is possible to provide the proper inclinations to the vertical of the filter screens required for the stereoscopic vision.

In order to reduce the strain on the network of interwoven wires 32 and 33, the lower portion of the frame where the springs 31 are attached is provided with a channel-shaped guide bar 37 (see FIGURES 3 and 4) which is secured on frame bar 25 and which is provided with a relatively thin widened top flange 38 formed with open-ended slots 39 receiving the shank portions of the top hooks 40 of springs 31, supporting the springs against lateral displacement relative to the frame when they are subjected to rapid changes in direction of movement.

Instead of employing an integral slotted or apertured top guide flange 38, the channel bar, shown at 37' in FIGURE 5A, may have a thin plate 41 rigidly secured thereon, said plate being coextensive in length with the channel bar and being formed with holes or slots 39' receiving the shank portions of the spring hooks 40.

Each of the filter frames is connected at its four sides to the sides of its stationary supporting frame 22 by tensioned spring means maintaining the filter frame in the same plane as the supporting frame 22. The top bar 24 is connected to the top of frame 22 by link bars 42 and coiled springs 43 at brackets 44 located so that the connected springs 43 and link bars 42 converge downwardly toward the same point as the strip 29. Each link bar 42 is provided at its top end with a peripherally grooved journalled roller 45 and each bracket 44 is provided with a similar peripherally grooved journalled roller 46 (see FIGURE 8), the springs 43 being formed at their ends with coplanar substantially circular hooks 47 and 48 engaged in the peripheral grooves of the journalled rollers 45 and 46, as shown in FIGURE 3.

Similar link bars 42 and coiled springs 43 connect the intermediate portion of the bottom frame bar 25 to the bottom of the stationary frame 22, being downwardly convergent toward the same point as strips 29.

Rigid downwardly convergent link bars 49, 49 connect the opposite end portions of bottom frame bar 25 to the bottom of rigid frame 22, arranged in the same manner as in U.S. Patent No. 2,198,678 to allow the frame assembly 23 to oscillate about the point of intersection of the longitudinal axes of these link bars.

The side bars 26 and 27 of the filter assembly 23 are connected to the sides of the stationary frame 22 by a plurality of horizontally arranged relatively heavy coiled springs 50 and cooperating link rods 51, in the manner illustrated, for example, in FIGURE 6. The outer ends of the coiled springs 50 are threaded on helically grooved plugs 52 which are pivoted to brackets 53 fixed to the sides of frame 22, the plugs 52 being connected to the brackets 53 by transverse pivot bolts 54. The inner ends of coiled springs 50 are threaded on helically grooved plugs 55, which are in turn threaded on the link rods 51 and locked in adjusted positions thereon by lock nuts 56. The link rods 51 are provided at their inner ends with bifurcated clevises 57 which receive the outwardly directed flanges of the filter frame bars and are pivotally connected thereto by transverse pivot rivets or bolts 58, extending parallel to the pivot bolts 54.

As will be readily apparent, the effective lengths of the side springs 50 may be adjusted by adjusting the amount of their engagements on the plugs 55 and 52, and the pre-tension of said springs may be adjusted by adjusting the positions of the plugs 55 on the threaded link rods 51.

The resilient link connections provided by the side spring assemblies, comprising springs 50 and link rods 51, allow smooth controlled lateral oscillation of the filter assembly in its frame 22, free articulation being provided by the parallel arrangement of the axes of the pivot bolts 54 and 58.

The filter assemblies are simultaneously oscillated in their planes by an electrical motor-driven mechanism comprising a motor unit 59. The unit 59 comprises an electric motor 60 which is rotatably mounted in a supporting cradle or housing 61, with the provision of means to adjust the motor around the axis of its shaft 62, whereby the phase of the filter assembly driving mechanism may be adjusted relative to the phase of the film-moving mechanism associated with the projection devices 20 and 21. Said phase-adjusting means may comprise an adjusting worm screw 63 rotatably mounted in the top wall of housing 61 which meshes with a peripheral worm gear on the motor 60, whereby motor 60 and its stator may be rotated by rotating the screw 63. Screw 63 may be adjusted manually or by any suitable remote-controlled mechanism.

The motor unit 59 is mounted on a stationary portion 65 of the frame of the apparatus 15 located below the filter assemblies, the shaft 62 of the motor 60 being connected to a crank disc 66 through a conventional centrifugal clutch 67, so that disc 66 is not rotated unless shaft 62 attains the necessary speed to oscillate the filter screens and associated parts at their natural resonant frequency. At said resonant frequency the filter screens oscillate easily because the horizontal springs 50 absorb their inertia forces. At lower speeds inertia forces due to non-resonance impose excessive stresses and strains on the moving parts of the assemblies.

A drive lever 68 is pivoted at one end at 69 to an upstanding lug 70 on support 65. A laterally projecting collar member 71 is integrally formed on the other end of lever 68. A link bar 100 drivingly connects collar member 71 to crank disc 66, and secured in said collar member parallel to lever 68 is a headed rod member 72, said rod member being rotatable around its axis in the collar member, but being normally clamped thereto by a lock nut 73. Rod 72 threadedly engages a nut 74 to which is pivotally connected an arm 75, as shown in FIGURES 10, 11 and 12. A flexible main drive cable 76 is connected to the free end of arm 75.

Nut 74 is provided with a guide flange 99 which slidably engages lever 68, as shown in FIGURE 12, being held thereagainst by the tension in cable 76. Cable 76 extends over guide pulleys 77 and 78 and is connected to one arm 79 of a lever 80 pivoted at 81 to an upstanding post 82 on support 65. A flexible cable 83 is connected to an opposite arm 84 of lever 80. Cable 83 extends over guide pulleys 85, 86 and 87 and is connected to a clevis 88 pivoted to an upstanding plate-like lug 89 secured to the intermediate portion of the top frame bar 24 of the filter assembly 23, as shown in FIGURE 2, thus providing a driving connection between lever 68 and said filter assembly.

The remaining filter assemblies are similarly driven, as by driving cables 90 and 91 connected to arms of pivoted bell crank levers 92 and 93 which are coupled to lever 80 by a link bar 94 connecting depending arms 95, 96 and 97 of the respective levers, as shown in FIGURE 2.

The amplitude of oscillation of the filter screens can be accurately adjusted by adjusting the position of the nut 74 on rod 72, which correspondingly adjusts the effective working length of the driving lever 68. Accurate adjustment of said amplitude is necessary since the illuminating light rays must not only be able to sweep the entire screen 16 but the image-forming stripes must join each other side-by-side without overlap in order to give the stereoscopically viewed picture a continuous aspect. The amplitude of oscillation of the filter screens may be adjusted by loosening the clamping nut 73 and rotating the adjusting rod 72; this adjustment may be made even during the operation of the apparatus if locknut 73 is loose. If so desired, suitable remote-controlled means may be provided to rotate the adjusting rod 72. In either case, rod 72 is adjusted as required sufficiently to eliminate visible stripes, namely, to cause the visible image-forming elements to join without overlap.

As above mentioned, proper synchronization of the oscillation of the filter screens with the film movement of the two projectors 20 and 21 can be obtained by suitably adjusting the phase of the driving motor 60 by means of the adjusting cradle arrangement shown in FIGURES 2, 13 and 14, or by any other suitable interlock means, such as selsyn or servo motors controlled by the position of the stator of motor 60 and arranged to develop and transmit a governing control signal to the projector motors. These selsyn or servo motors may be cradle-mounted in such a manner that the rotation of the stator of one of the controlled motors, for example, motor 60, develops a signal to correspondingly shift the phase of the projection motors to insure occultation of the projection at the exact moment when on the screen the illuminated strips approaching one terminus of a run intervene exactly with the positions they will occupy when approaching the other terminus of run of the filter screen. If this condition is not strictly fulfilled, stripes will be perceived; therefore phase control is required to provide phase shift as above described whenever necessary.

With proper adjustment of the amplitude of oscillation of the filters and the relative phase of said oscillation with respect to the action of the projectors to provide occultation at the exactly selected moment, the stereoscopic picture will present a continuous aspect.

While a specific embodiment of an improved apparatus for stereoscopic projection has been disclosed in the foregoing description, it will be understood that various modifications within the spirit of the invention may occur to those skilled in the art. Therefore, it is intended that no limitations be placed on the invention except as defined by the scope of the appended claims. Finally, it is remarked that the conception of the aforesaid improved apparatus would also allow his starting off with filter-screens located according to FIGURE 1 turned upside down.

What is claimed is:

1. In a stereoscopic picture projecting apparatus with a projection screen and projection devices operative to project two series of stereoscopic pictures upon the screen in stereoscopic relation and through plane filter screens adjacent to the projection screen, said filter screens comprising a rigid frame, a plurality of closely spaced elongated rigid convergent opaque strips interwoven between intersecting diagonally arranged tensioned thin wires secured in the frame and clamping each strip to form a tensioned plane texture which is rigid against transverse and lateral displacement with regard to the frame when the filter screens are oscillated laterally in their own planes as a unit to allow the projection and vision of the complete stereoscopic pictures without any optical disturbances.

2. The structure of claim 1, and further including adjustable side spring assembly means resiliently supporting each filter in a stationary outer frame for oscillation in its own plane, wherein each side spring assembly and its adjusting means comprises a link rod pivotally connected to the vertical sides of the associated filter screen, a first helically grooved plug threadedly engaged on said link rod, a coiled spring threadedly engaged at one end on said first plug, a second helically grooved plug threadedly engaged in the opposite end of said coiled spring, and means pivotally connecting said second plug to the adjacent side of said outer frame.

3. The structure of claim 1, and wherein said means for simultaneously oscillating the filter screens comprises spring means connected to the screens biasing them toward predetermined balanced positions in their own planes, a driving lever, means to oscillate said driving lever, a connection element mounted on said driving lever, means to adjust the connection element along the length of said driving lever, and force-transmitting means connecting said connection element to said filter screens, whereby the amplitude of the oscillating movement of the screens may be adjusted by adjusting said connection element along said driving lever.

4. The structure of claim 1, and wherein said means for simultaneously oscillating the filter screens comprises spring means biasing them toward predetermined balanced positions in their own planes, a driving lever, force-transmitting means connecting said driving lever to said filter screens, a motor support, an electric motor mounted on said support, crank means drivingly connecting the shaft of said motor to said driving lever, and means to adjust the motor around its shaft axis on said support, whereby to vary the phase of the oscillating movement of the filter screens.

5. The structure of claim 4, and wherein said crank means includes a centrifugal clutch.

6. In a stereoscopic picture projecting apparatus with a projection screen and projection devices operative to project two series of stereoscopic pictures upon the screen in stereoscopic relation and through plane filter screens adjacent to the projection screen, said filter screens comprising, a substantially rigid frame, several elongated relatively rigid thin bodies being arranged in side by side relation and being formed to present a plurality of closely spaced convergent opaque strips, said bodies being rigidly connected to the frame at one end, spring means connecting the other end to the opposite side of the said frame, said spring means comprising single springs connected to at least two of the strips and means oscillating said filter screens laterally in their own planes as a unit to allow the projection and vision of the complete stereoscopic pictures without any optical disturbances.

7. The structure of claim 6, and a plurality of diagonally arranged tensioned thin wires secured in the frame and being tressed and interwoven with the strips to limit transverse and lateral movement of the strips relative to the frame.

8. The structure of claim 6, and a texture of diagonally arranged tensioned interwoven thin wires secured in the frame and comprising elements extending in opposite diagonal directions, the strips being interwoven between the intersecting thin wires and being held thereby against transverse and lateral displacement relative to the frame.

9. In a stereoscopic picture projecting apparatus, a projection screen, two projection devices operative to project two series of stereoscopic pictures having left and right eye picture elements upon the screen in stereoscopic relation, and filter means for obscuring the left eye picture elements from the right eye of an observer and obscuring the right eye picture elements from the left eye of the observer, said filter means comprising a plurality of spaced screens disposed in front of and adjacent to the projection screen, each of said spaced screens converging substantially to a common line of intersection in the plane of the projection screen, each of said spaced screens comprising a substantially rigid frame having side, top and bottom bars, at least one depending relatively rigid body in the frame, means rigidly securing the top end of the body to said top bar, and means resiliently connecting the bottom end of said body to the bottom bar, said body being formed to define a plurality of closely spaced opaque strips converging to a point beyond the frame, the strips of the respective screens bing disposed to limit the opposite side margins of each picture element on the projection screen, and means for simultaneously reciprocating the spaced screens laterally in their own planes as a unit comprising spring means connected to the screens biasing them toward predetermined positions in their own planes, a driving lever, means to oscillate said driving lever, a connection element mounted on said driving lever, means to adjust the connection element along the length of said driving lever, and force-transmitting means connecting said connection element to said spaced screens, whereby the amplitude of the reciprocating movement of the screens may be adjusted by adjusting said connection element along said driving lever.

10. In a stereoscopic picture projecting apparatus, a projection screen, two projection devices operative to project two series of stereoscopic pictures having left and right eye picture elements upon the screen in stereoscopic relation, and filter means for obscuring the left eye picture elements from the right eye of an observer and obscuring the right eye picture elements from the left eye of the observer, said filter means comprising a plurality of spaced screens disposed in front of and adjacent to the projection screen, each of said spaced screens converging substantially to a common line of intersection in the plane of the projection screen, each of said spaced screens comprising a substantially rigid frame having side, top and bottom bars, at least one depending relatively rigid body in the frame, means rigidly securing the top end of the body to said top bar, and means resiliently connecting the botom end of said body to the bottom bar, said body being formed to define a plurality of closely spaced opaque strips converging to a point beyond the frame, the strips of the respective screens being disposed to limit the opposite side margins of each picture element on the projection screen, and means for simultaneously reciprocating the spaced screens laterally in their own planes as a unit comprising spring means biasing them toward predetermined positions in their own planes, a driving lever, force-transmitting means connecting said driving lever to said spaced screens, a motor support, an electric motor mounted on said support, crank means drivingly connecting the shaft of said motor to said driving lever, and means to adjust the motor around its shaft axis on said support, whereby to vary the phase of the reciprocating movement of the spaced screens.

11. The structure of claim 10, and wherein said crank means includes a centrifugal clutch.

References Cited by the Examiner

UNITED STATES PATENTS 2,198,678  4/40  Noaillon _____ 88—28.9 X

FOREIGN PATENTS 742,388  12/32  France.
1,104,969  6/55  France.

JULIA E. COINER, *Primary Examiner.*